Patented Feb. 19, 1946

2,395,339

UNITED STATES PATENT OFFICE 2,395,339

SAPOGENIN DERIVATIVES AND PREPARATION OF SAME

Russell Earl Marker, Mexico City, Mexico, and Harry Means Crooks, Jr., and Eugene Leroy Wittle, Detroit, Mich., assignors to Parke, Davis & Company, Detroit, Mich., a corporation of Michigan No Drawing. Original application May 15, 1941, Serial No. 393,666. Divided and this application May 24, 1944, Serial No. 537,198

4 Claims. (Cl. 260—210)

The invention relates to the preparation of steroidal compounds and this application is a division of our copending application, Serial No. 393,666, filed May 15, 1941, now Patent No. 2,352,-851, issued July 4, 1944.

This application relates more particularly to the preparation of glycosidic derivatives of 20-keto-16-(δ-acyloxy-isocaprooxy)-pregnane compounds and the hydrolysis of the same by alkaline agents to obtain $\Delta^{16}$-20-keto-pregnene compounds having unacylated sugar residues attached to the steroid nucleus.

According to this invention, the pseudo-sapogenins or their ring A and/or B glycosidic derivatives are prepared by reacting glycosidic derivatives of the sapogenins with acidic agents, for example, acylating agents such as acid anhydrides, under conditions more vigorous than those required merely for acylation.

By glycosidic derivatives of the sapogenins we mean sapogenin derivatives in which sugar residues are attached through a hemi-acetal linkage to the cyclopentanoperhydrophenanthrene nucleus. In general, the exact nature of the structures of these substances are not known with certainty. The following formulae illustrate various types of the above sapogenin glycosides:

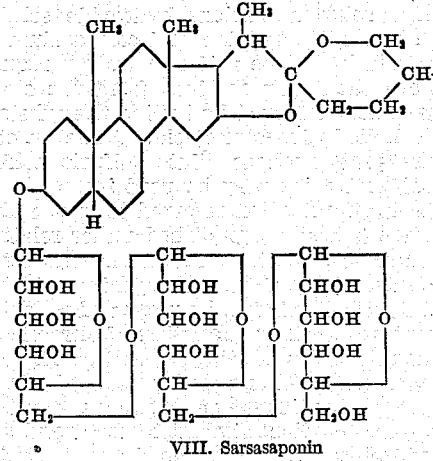

VIII. Sarsasaponin

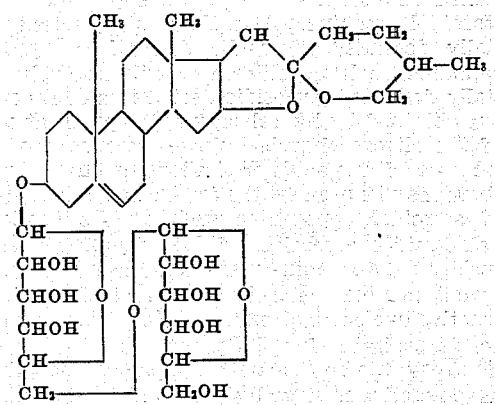

IX. Trillarin

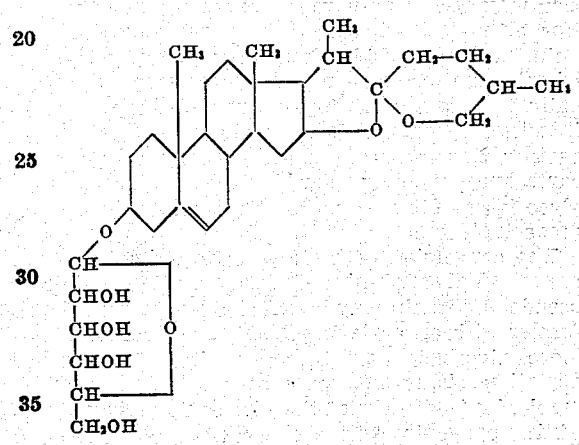

X. Trillin

Generally speaking the glycosides of the steroidal sapogenins may be classified as (1) saponins; (2) simpler glycosides. The former usually contain from three to six sugar units, all of which may be the same, or they may be different. The most commonly occurring sugar units are those of glucose, galactose, rhamnose, and xylose. The simpler glycosides differ from the saponins in that (1) they contain fewer, i. e., one to three, sugar units; (2) they are more readily obtained crystalline; (3) they do not show marked capillary active properties. In most cases, including the compounds represented by VIII, IX, and X, the exact nature of the glycosidic linkages is not definitely known; that is, it is not known whether the sugars have a furanose or pyranose structure, nor which carbon atoms of the different sugar units are (through oxygen) united. In many cases even the number and kind of sugar units present are not known.

See further, Fieser, Chemistry of Natural Products Related to Phenanthrene, 2nd ed., p. 333 ff. (Reinhold Publishing Corporation, New York city, 1937).

Since the steroidal sapogenins occur in nature, not in the free form, but combined with sugar units as glycosidic derivatives, the present invention makes it unnecessary to isolate the sapogenins. Instead, their more readily available glycosides may be converted directly to pseudo-sapogenin derivatives. This elimination of a formerly essential step results in higher yields of steroidal hormones from plant sources.

As naturally occurring glycosidic derivatives of steroidal sapogenins which may be used in the practice of this invention, there may be mentioned amolonin, sarsasaponin, digitonin, or like steroidal saponins. Also, there may be used partially degraded glycosidic derivatives of these saponins, such as trillarin or trillin. Such partially degraded glycosidic derivatives of saponins are obtained by hydrolyzing the saponin at some of the oligosaccharide linkages by means of enzymes or dilute acids or similar reagents. Again, there may be used synthetic glycosidic derivatives of steroidal sapogenins such as the synthetic galactosides, glucosides, ribosides, and other glycosides of sapogenins such as sarsasapogenin, diosgenin, or other steroidal sapogenins containing reactive nuclear hydroxyl groups. Synthetic glycosides suitable for the practice of this invention may also be prepared from sapogenins which have reactive nuclear hydroxyl groups, but which are not aglycones of naturally occurring saponins. tion may also be prepared from sapogenins which For example, although neither epi-sarsasapogenins nor its glycosides occur in nature, glycosides of epi-sarsasapogenin may be prepared synthetically from sarsasaponin by converting the latter into its aglycone, sarsasapogenin, and then converting this into epi-sarsasapogenin. The epi-sarsasapogenin may then be treated to form the glycoside as for example by treatment with bromoacetoglucose.

The conversion of the glycosidic derivative of the steroidal sapogenin into an acylated glycosidic pseudo-sapogenin may be effected by treating the former with an acylating agent under conditions more vigorous than those required for mere acylation. This step may be effected, for example, by treatment of the glycosidic derivatives of the sapogenins with a carboxylic anhydride at 175–250° C. We have found that best results are obtained with lower fatty acid anhydrides while maintaining the reaction temperature in the neighborhood of 200° C. The product thus formed is an acylated glycosidic pseudo-sapogenin derivative acylated at least at the exo-hydroxyl group and in the sugar residues.

The acylated glycosidic pseudo-sapogenin derivatives may be mildly oxidized in the side chain attached to ring D with production of an acylated glycosidic derivative of a steroid having in ring D the structure

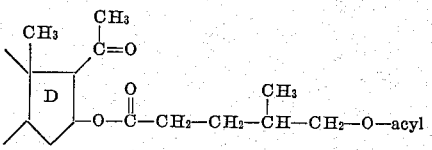

In this case the remainder of the steroid molecule containing the acylated sugar residues remain substantially unaffected during the oxidation and the product may then be hydrolyzed with production of a steroid having in ring D the structure

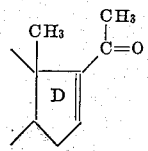

The above hydrolysis acts both upon the δ-acyloxy-isocaprooxy group attached to C–16 and the acylated sugar residues in the other portions of the steroid nucleus. Certain rules can be set down with regard to the products formed during this hydrolysis. The δ-acyloxy-isocaprooxy group at C–16 is hydrolytically removed with production of a steroid having in ring D the structure

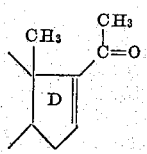

under conditions of very mild hydrolysis, as for example by treatment with dilute acidic or alkaline reagents. For instance, this group is removed by warming the steroid with dilute alcoholic hydrochloric acid, dilute sodium carbonate solution or dilute barium hydroxide solution. On the other hand, the acylated sugar residues in the remainder of the molecule are affected differently, depending on whether the conditions of hydrolysis are alkaline or acidic. Mild alkaline hydrolysis removes only the acyl groups attached to the sugar residue, while leaving the sugar residues still attached to the steroid nucleus. However, acid hydrolysis removes the sugar residues as well, thereby leaving hydroxyl groups in the steroid nucleus at the position to which the sugar residues were formerly attached. Suitable alkaline reagents for removal of the acyl groups from the sugar residues, while leaving the unacylated sugar residues thus formed still attached to the steroid nucleus, include cold sodium methylate solution, barium hydroxide solution, calcium hydroxide solution and cold sodium hydroxide solution. The acidic hydrolysis required to remove the sugar residues from the steroid nucleus is best achieved by boiling the substance with alcoholic hydrochloric acid. However, other acidic reagents such as dilute sulfuric acid, or other mineral acids may be used instead.

The step of oxidation referred to in the above description is best accomplished under relatively mild conditions. We have found that best results are obtained if the pseudo-sapogenin derivatives are oxidized below 50° C. by means of an oxidizing agent of the class consisting of chromic and permanganic acids and their salts. However, other oxidizing agents such as ozone, hydrogen peroxide, and the like may effectively be employed in this step. Particularly satisfactory results are obtained when the oxidation is conducted at 20-35° C. in acetic acid, using chromic anhydride as the oxidant.

Our invention may be further illustrated by the following examples.

Example 1

The saponin from *Trillium erectum* is obtained and converted into the acetate of *Trillium erectum* pseudo-saponin as described in Serial No. 393,666. This product is dissolved in 2 liters of glacial acetic acid and added at 30° C. to a stirred solution of 25 g. of chromic anhydride in 1 liter of 60% acetic acid. After the mixture has stood one and a half hours at this temperature, the excess chromic anhydride is destroyed by addition of zinc powder. The solution is filtered from excess zinc and the filtrate is concentrated in vacuo. The residue is dissolved in ether and washed with water and saturated sodium bicarbonate solution. The ethereal solution is evaporated to leave a clear yellow gummy residue weighing about 120 g. This residue consists essentially of the substance representable by the formula,

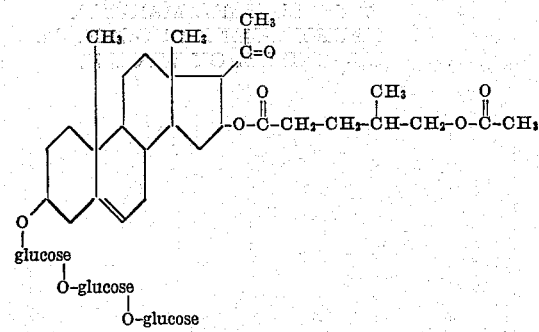

The above residue is then subjected to mild alkaline hydrolysis as hereinbefore described.

Example 2

Pseudo-trillin acetate is obtained and oxidized to its C-16 ester as described in Serial No. 393,666. It is then subjected to mild alkaline hydrolysis as hereinbefore described, forming a $\Delta^{16}$-20-keto steroid having an unacylated sugar residue attached to the steroid nucleus.

Example 3

Pseudo-sarsasapogenin-α-glucoside penta-acetate is prepared as described in Serial No. 393,666. This substance may be represented by the following structural formula,

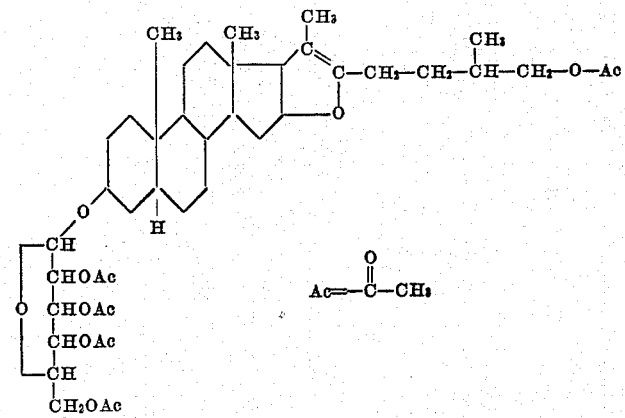

It is subjected to mild alkaline hydrolysis as hereinbefore described forming the corresponding $\Delta^{16}$-20-keto steroid having an unacylated sugar residue attached to the steroid nucleus at $C_3$.

What we claim as our invention is:

1. The process which comprises hydrolyzing an acylated glycosidic derivative of a steroid having in ring D the structure

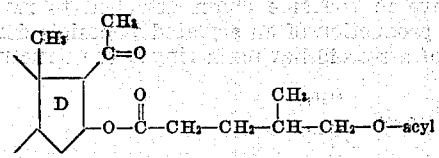

by treating said acylated glycosidic derivative with an alkaline reagent, with production of an unacylated glycosidic derivative of a steroid having in ring D the structure

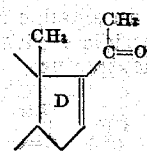

and having an unacylated sugar residue attached to the steroid nucleus.

2. The process which comprises mildly oxidizing a glycosidic derivative of a pseudo-sapogenin acylated at least at the exo-hydroxyl group and in the sugar residues, with production of an acylated glycosidic derivative of a steroid having in ring D the structure

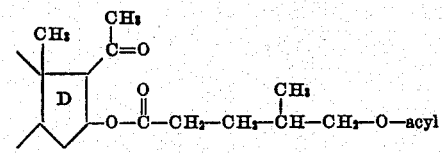

subjecting said acylated glycosidic derivative to hydrolysis with an alkaline reagent, with production of a glycosidic derivative of a steroid having in ring D the structure

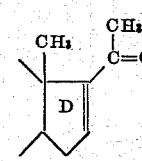

and having an unacylated sugar residue attached to the steroid nucleus.

3. The process for the preparation of steroidal compounds which comprises isomerizing and acylating the side chain attached to ring D of a glycosidic derivative of a steroidal sapogenin by reacting said glycosidic derivative with an acylating agent under conditions more vigorous than those required for mere acylation, with production of a glycosidic derivative of a pseudo-sapogenin acylated at least at the exo-hydroxyl group and in the sugar residues, mildly oxidizing said acylated glycosidic pseudo-sapogenin derivative in the side chain attached to ring D, with production of an acylated glycosidic derivative of a steroid having in ring D the structure

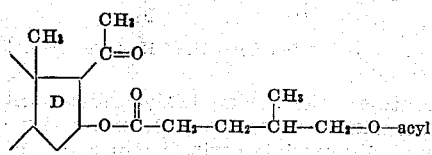

and subjecting said acylated glycosidic derivative to hydrolysis with an alkaline reagent, with production of a glycosidic derivative of a steroid having in ring D the structure

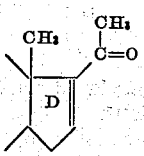

4. The process which comprises hydrolyzing an acylated glycosidic derivative of a steroid having in ring D the structure

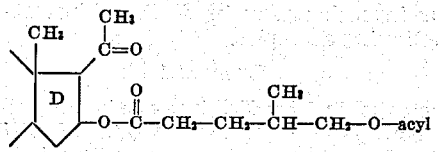

by treating said acylated glycosidic derivative with an alkaline reagent of the class consisting of cold sodium methylate solution, barium hydroxide solution, calcium hydroxide solution and cold sodium hydroxide solution, with production of an unacylated glycosidic derivative of a steroid having in ring D the structure

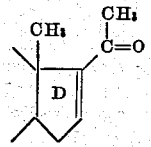

and having an unacylated sugar residue attached to the steroid nucleus.

RUSSELL EARL MARKER.
HARRY MEANS CROOKS, Jr.
EUGENE LEROY WITTLE.